United States Patent [19]

Karnes

[11] Patent Number: 4,602,846
[45] Date of Patent: Jul. 29, 1986

[54] METER READING TOOL

[76] Inventor: Danny D. Karnes, Rte. 1, Box 148, Symsonia, Ky. 42082

[21] Appl. No.: 653,302

[22] Filed: Sep. 24, 1984

[51] Int. Cl.$^4$ .......................... G02B 27/02; G02B 7/00
[52] U.S. Cl. .................................... 350/114; 350/319; 350/244; 350/582; 15/105
[58] Field of Search ............... 350/319, 110, 114, 243, 350/244, 582, 584; 15/105, 160

[56] References Cited

U.S. PATENT DOCUMENTS 2,795,165  6/1957  Vernier .
3,499,698  3/1970  Malys .
3,612,649  10/1971  Pusey .
4,215,916  8/1980  Bell et al. .
4,515,437  5/1985  Story .................................... 350/319

*Primary Examiner*—Henry Jon W.
*Attorney, Agent, or Firm*—King and Schickli

[57] ABSTRACT

A submersible tool for reading water meters includes a cylindrical body member having a bottom end sealed with a sight glass. A brush is mounted to the body member adjacent the bottom end. The brush bristles are contoured to correspond to the shape or periphery of the water meter so as to aid in aligning the body member over the meter face to provide a direct sight path to the meter face through accumulated water in the meter box. The brush is triangular to provide strength. A shrinkable loop secures the brush to the tool.

6 Claims, 4 Drawing Figures

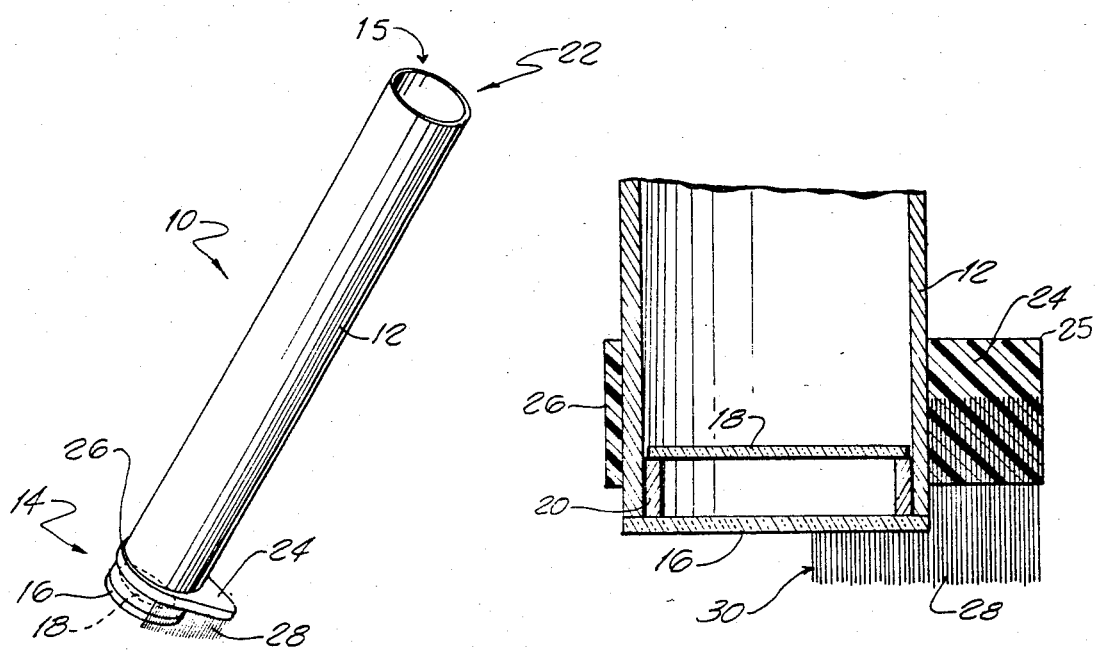
Fig. 1
Fig. 2
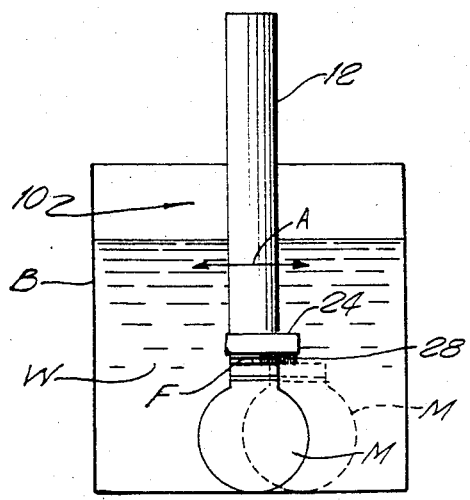
Fig. 4
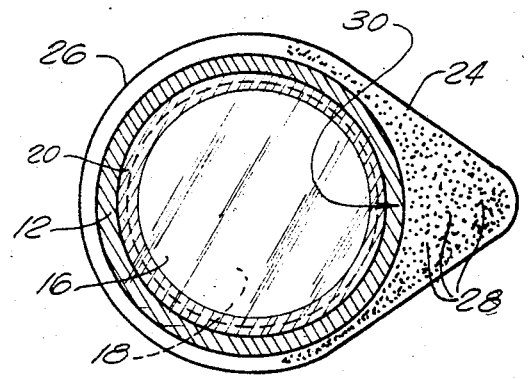
Fig. 3

METER READING TOOL

BACKGROUND OF THE INVENTION

The present invention relates to meter reading tools and, more particularly, to a submersible meter reading tool including a specially designed brush for cleaning the meter face and facilitating the alignment of the reading tool over the meter face.

In order to provide out-of-sight water lines and to prevent freezing in the winter, utility water lines are buried below ground level. Water meters connected to these lines are typically contained in underground wells or boxes. In poorly drained soil and particularly in low level regions, water frequently stands in the boxes above the face of the meter. Water above the meter face makes it difficult or impossible to read the numbers of the meter. The rise of the water since the last reading and the subsequent settling of the silt or dirt on the meter face further hinders the meter reading. Thus, it often becomes necessary to bail water from the meter box and then wipe the silt or dirt from the meter face in order to read the meter. Such a labor intensive job is very costly to the utility company, and ultimately to the consumer.

This problem has been recognized in the past and addressed in the prior art. Examples of prior art patents include U.S. Pat. Nos. 3,612,649 to Pusey and 4,215,916 to Bell, et al. The Pusey patent discloses an underground meter reading tool including a hollow tube having a squeeze bulb at the top end and a valve and nozzles at the bottom end. By squeezing the bulb, water contained in the tube is forced through the nozzles to provide water jets to flush and thus clean the meter face. A magnifying glass connected to and extending along side the tube is then used to read the meter. The Pusey device is useful; however, it does not effectively and completely solve the problem. The water jets do not always clean the meter face effectively, especially where silt has become encrusted on the face. Also, the tool is heavy, especially with cleaning water being stored in the tube, and this adds substantially to the fatigue of the meter reader thus reducing the efficiency of the operation. Also, Pusey makes no provision for providing a direct sight path to the meter face through the accumulated water in the meter box.

The Bell patent recognizes the need for a direct sight path and thus provides a meter reading device including a cylindrical telescope. The top end of the telescopic body is covered by a clear lens and the lower end is covered by another lens so that direct reading is possible. The lower lens has a small aperture to provide a water jet for cleaning the meter face as the telescopic body is moved in and out.

While the Bell reference eliminates the need for bailing water from the meter box and provides a direct sight path to the meter face, it is not without its disadvantages. As with the Pusey meter reading device the tool is cumbersome and heavy. Also, a jet stream of water simply does not provide the necessary cleaning of the meter face. For example, the water level in the meter box drops below the meter face, silt or dirt deposited on the face dries out and hardens to a crusty covering. Even if water is then available to load the Bell scope, the jet stream doesn't have the force required to clean this crusty deposit from the meter face.

Furthermore, if the meter box is full, the Bell scope must be pushed down hard against the meter face and carefully held against tilting. This is necessary since the water jet action stirs up the muddy water, and if allowed to run back into the telescopic body through the aperture in the lower lens, the meter face is once again obscured. This makes the job very tedious and tiring for the meter reader, especially since the tool is also relatively heavy.

Additionally, both the Pusey and Bell devices fail to provide any means for quickly aligning the magnifying glass or scope, respectively over the meter face. This is particularly important since after cleaning a submerged meter face, dirt and silt in the water in the meter box is stirred up and the water becomes murky. The murky water obscures the meter and makes it difficult to quickly and accurately align the scope over the meter face to take a reading. A need is therefore identified for an improved tool for reading underground meters.

SUMMARY OF THE INVENTION

Accordingly, it is a primary object of the present invention to provide an improved tool for reading submerged meters overcoming the above-described limitations and disadvantages of the prior art.

Another object of the invention is to provide an improved submersible meter reading tool allowing easy cleaning and sighting along a direct sight path to the face of a submerged meter through the accumulated water in the meter box.

Still another object of the present invention is to provide an improved submersible meter reading tool allowing improved cleaning action of the meter face including the cleaning of dried and hardened silt or dirt.

An additional object of the present invention is to provide a tool that is lightweight and easy to handle and manipulate to allow cleaning and reading of meters with the least effort and fatigue, and in the shortest amount of time.

Another object of the present invention is to provide a meter reading tool that is highly effective, but low in initial cost and has no moving parts to provide for minimum maintenance.

A further object of the present invention is to provide an improved meter reading tool for cleaning silt and dirt from the meter face and providing a means for aligning the tool over the cleaned meter face so as to provide a direct sight path to the face.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved tool is provided for reading meters, such as water meters submerged in accumulated water in an underground meter box. The meter reading tool includes a cylindrical body member having a transparent sight glass to provide a sealed bottom end. A combined cleaning and aligning brush is mounted to the body member adjacent the bottom end. The brush may include a shrinkable mounting loop for engaging and tightening around the cylindrical body member. The projecting upper edge of the brush may be used to open the meter lid for added convenience.

Preferably, the brush bristles extend around substantially 120 degrees of the cylindrical body member. The bristles extend below the sealed bottom end of the cylindrical body member to allow scrubbing and wiping action against the meter face as the meter reader moves the tool in a simple back and forth movement. The body of the brush is triangular to add strength. Most importantly, the contour of the inner face of the brush adjacent the lens is curved to conform to the periphery of the meter to allow the aligning of the cylindrical body member over the meter face. As the last pass across the meter face is made, the meter reader simply lowers the tool to allow the brush to extend down along the side of the meter face. With a simple swing back toward the meter, the face of the brush instantly aligns the tool over the face, and a reading is taken.

A magnifying glass may be provided in the cylindrical body member to furnish enlarged images of the meter numbers for easier reading. The magnifying glass may be mounted above the sight glass that seals the bottom end of the cylindrical body member. Preferably the magnifying glass is mounted to the top of a spacer tube that spaces the magnifying glass from the sight glass for appropriate meter number image enlargement. The spacer tube also slidably engages the periphery of the inside of the body member so as to secure the magnifying glass in position. In addition, the upper end of the cylindrical body member is open to allow direct viewing through the tool.

Still other objects of the present invention will become readily apparent to those skilled in the art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects, all without departing from the invention. Accordingly, the drawing and descriptions will be regarded as illustrative in nature and not as restrictive.

BRIEF DESCRIPTION OF THE DRAWING

The accompanying drawing incorporated and forming a part of the specification, illustrates several aspects of the present invention, and together with the description serves to explain the principles of the invention. In the drawing:

FIG. 1 is a perspective view of the submersible meter reading tool of the present invention;

FIG. 2 is a broken away cross-sectional view of the bottom end of the tool of the present invention;

FIG. 3 is a bottom plan view of the tool of the present invention; and

FIG. 4 is a schematical representation showing the meter reading tool of the present invention positioned over the face of an underground meter for the taking of a meter reading.

Reference will now be made in detail to the present preferred embodiment of the invention, an example of which is illustrated in the accompanying drawing.

DETAILED DESCRIPTION OF THE INVENTION

Reference is now made to FIG. 1 showing the improved submersible meter reading tool 10 of the present invention. The meter reading tool 10 includes a hollow, cylindrical body member 12. The bottom end 14 of the cylindrical body member 12 is sealed with a sight glass or lens 16. The top end 15 of the cylindrical body member is open.

As shown in FIG. 2, a magnifying glass 18 is mounted in the cylindrical body member 12 above the sight glass 16. For ease of positioning within the cylindrical body member 12, the magnifying glass 18 is first mounted to the top of a spacer tube 20 as, for example, by means of glue, epoxy cement or the like. The tube 20 is approximately 1-2 inches in length so as to space the magnifying glass 18 from the sight glass 16. The magnifying glass so positioned serves to enlarge the meter numbers for easier reading when the tool 10 is properly positioned over the meter face F.

The spacer tube 20 has an outer diameter dimension for slidably engaging the interior periphery of the cylindrical body member 12. The magnifying glass 18 may easily be positioned within the cylindrical body member 12 by first slipping the spacer tube and magnifying glass assembly into the open top end 15 of the body member. A longer rod or tube may then be used to gently advance or push the spacer tube 20 and magnifying glass 18 down into the cylindrical body member 12 until properly positioned adjacent the sight glass 16 at the lower end 14 (see FIG. 2). Once positioned, the friction between the exterior periphery of the spacer tube 20 and the interior periphery of the cylindrical body member 12 securely holds the magnifying glass 18 in place.

In use, the cylindrical body member 12 provides a direct sight path through accumulated water in a meter box to the face of the meter. The meter reader positions the body member 12 over the meter face and looks down through the body member (see FIG. 4). Since the top end 15 is open and bottom end 14 of the body member 12 is sealed, the sight path through to the meter face is clear for easy viewing.

A brush 24 is mounted to the cylindrical body member 12 adjacent the bottom end 14 by means of a plastic, shrinkable mounting loop 26. The loop 26 is heated, such as by hot air from a hair dryer, and then placed or looped around the cylindrical body member 12. As the loop cools, it shrinks and tightens around the cylindrical body member 12 so as to secure the brush 24 in position with bristles 28 extending beyond or below the sight glass 16.

The brush 24 includes a plastic block with the bristles securely fastened in or integral with the block, as shown in FIG. 2. As thus constructed, the brush attachment of the present invention is very low cost and easily affixed to a variety of meter reading tools.

The body of the brush 24 is triangular extending to a point substantially beyond the body member 12 of the tool 10 (see FIG. 3). This allows the projecting upper edge 25 (FIG. 2) to be conveniently used to lift the meter lid (if present). Below the thickened, triangular body of bristles 28 provides strength and stability to allow effective scrubbing and wiping action on the face of a meter. This is true even if encrusted dirt and silt are present as when the water level in the box drops below the meter face. Also, the angled faces of the brush bristles contributes to sidewise plowing action of the dirt and silt as it is being wiped providing still greater cleaning efficiency.

As shown in FIG. 3, the bristles 28 of the brush 24 extend around approximately 120° of the circumference of the cylindrical body member 12. The interior or inner face 30 of the bristles 28 is shaped to conform to the curved periphery of the meter M (see also FIG. 4). The curved interior face 30 allows the tool 10 to be quickly and accurately positioned in alignment over the meter face. This feature is most important in reaching the objectives of allowing improved ease of use. As the tool 10 is moved back over the meter M after the last cleaning stroke, the curved face 30 engages and conforms to the face F providing the perfect alignment to allow reading of the meter.

With reference to FIG. 4, the most efficient use of the meter reading tool 10 can be summarized. The tool is guided into the meter box and submerged into water W (if present). The brush 24 is scrubbed back and forth across the meter face F so as to remove silt and dirt (note action arrow A and dashed line relative position of meter M). The cleaning of the meter face in this manner minimizes stirring up dirt in the water W in the meter box B. However, it is still difficult to quickly align the glass 16 of meter reading tool 10 over the meter face F. Thus, after the last cleaning stroke, the tool 10 is simply lowered slightly, and moved to the left in FIG. 4, all in an essentially uninterrupted motion (note full line relative position of tool 10 and meter M).

This action quickly brings the interior face 30 of the brush 24 into conforming contact with the periphery of the meter M. The interior face 30 cradles the meter M and guides the sight glass 16 into reading position directly over the meter face F. Since the interior face 30 creating the alignment is formed of resilient bristles 28, there is no fear of damaging the bottom end 14 including the glasses 16, 18 if the engagement is made too forceful. The bristles 28 are effective to absorb the alignment shock. The meter reader then looks down into the cylindrical body member 12 through the magnifying glass 18 and sight glass 16 to easily read the meter.

As long as sidewise holding pressure is maintained on the body member 12 (to the left in FIG. 4), the tool 10 remains secured in the reading position. This allows reading the meter without rushing before the tool 10 slips out of alignment, and even time to double check the reading if necessary. There is no need to tediously align and realign the tool once the brush 24 is brought into proper engagement along the side of the meter face F.

In summary, numerous benefits have been described which result from employing the concepts of the invention. Specifically, the specially designed brush 24 of the meter reading tool 10 of the present invention provides both a means for efficiently cleaning the meter face F and as well as alignment of the tool over the meter M. The special curved interior face 30 of the bristles 28 accurately and resiliently aligns and holds the tool in position. The triangular shape of the brush 24 provides strength sufficient to remove even encrusted silt as may be present when the water level in the box drops below the meter face. Furthermore, the brush 24 is of simple, low cost construction and easily installed on the meter reading tool 10 by a heat activated loop 26. The tool 12 is lightweight and easy to manipulate for cleaning as well as reading the meter M, thus providing substantial improvement in meter reading efficiency over that attained by using the prior art devices.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A submersible tool for reading a face of a meter in a meter box, comprising:
a cylindrical body member having a transparent, sealed bottom end and a combined cleaning and aligning means mounted to said body member adjacent said bottom end; said cleaning and aligning means including a brush for cleaning dirt from the meter face, said brush including bristles having a boundary substantially circularly curved to substantially conform to the periphery of a circular meter, thereby allowing engagement with the meter to easily align the transparent end of the body member over the clean meter face so as to provide a substantially direct sight path to the face through accumulated water in the meter box.

2. The tool of claim 1, wherein said brush includes a shrinkable mounting loop for engaging said cylindrical body member.

3. The tool of claim 1, wherein brush bristles provided in said brush extend around substantially 120° of said cylindrical body member.

4. The tool of claim 1, wherein said transparent, sealed bottom includes a sight glass and a magnifying glass is mounted within said cylindrical body member above said sight glass so as to aid in reading the meter.

5. The tool of claim 4, wherein said magnifying glass is mounted to a spacer tube that spaces the magnifying glass from the sight glass and engages the periphery of the inside of the cylindrical body member to secure the magnifying glass in position.

6. The tool of claim 1, wherein the upper end of the cylindrical body member is open for direct viewing.

* * * * *